United States Patent [19]

Te Winkel et al.

[11] 3,766,543

[45] Oct. 16, 1973

[54] CURRENT DIVIDER

[75] Inventors: Jan Te Winkel; Loenard Jan Maria Esser, both of Emmasingel, Eindhoven, Netherlands

[73] Assignee: U.S. Philips Corporation, New York, N.Y.

[22] Filed: Dec. 1, 1971

[21] Appl. No.: 203,576

[30] Foreign Application Priority Data

Dec. 9, 1970 Netherlands ...................... 7017918

[52] U.S. Cl. .......................... 340/347 DA, 307/229

[51] Int. Cl. .......................................... H03r 13/02

[58] Field of Search ............ 340/347 DA, 347 AD; 307/229, 230, 235, 236, 270, 313

*Primary Examiner*—Thomas A. Robinson

*Attorney*—Frank R. Trifari

[57] ABSTRACT

Current divider for producing a plurality of currents which are in fixed ratios to one another at a plurality of output termiansl which are connected to a sum terminal through a circuit. The currents are obtained by means of mathced transistors having parallel-connected base-emitter paths. In order to compensate for deviations in the desired currents due to the base currents of said transistors, provision is made for a compensating circuit which insures that accurately defined currents are supplied to and/or derived from each of the circuits. The compensating circuit includes at least one transistor having its emitter-collector path included in a circuit having a current deviation of one polarity while its base is connected to a circuit having a current deviation of opposite polarity.

16 Claims, 9 Drawing Figures

Figure 1:
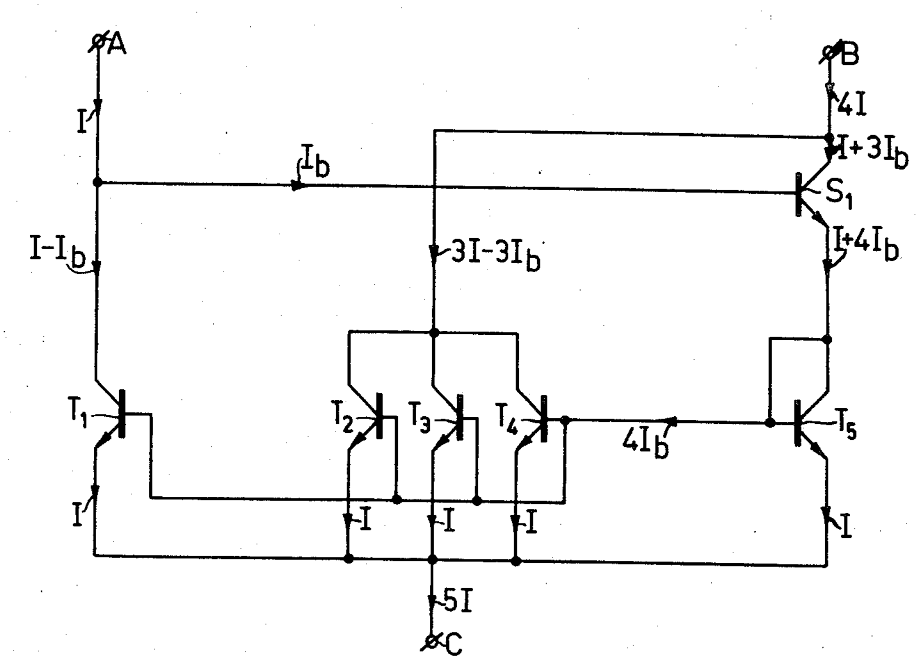

INVENTORS
JAN TE WINKEL
LEONARD J.M. ESSER
BY
Frank R. Trifari
AGENT

INVENTORS
JAN TE WINKEL
LEONARD J.M. ESSER
BY
AGENT

INVENTORS
JAN TE WINKEL
LEONARD J.M. ESSER
BY
AGENT

INVENTORS
JAN TE WINKEL
LEONARD J.M. ESSER
BY
AGENT

INVENTORS
JAN TE WINKEL
LEONARD J.M. ESSER
BY
AGENT

CURRENT DIVIDER

The invention relates to a current divider which comprises a plurality of circuits connecting a current terminal to a common sum terminal. These current terminals carry currents which are in fixed integral ratios to one another; this ratio or these ratios being different from unity for at least two currents, while the sum terminal carries the sum current of the currents at the current terminals. The currents being produced by means of semiconductor elements, in particular transistors of equal type which when their base emitter voltages are equal pass emitter currents which are in integral ratios to one another, the highest common factor being a current I, while at least one of the said semiconductor elements is a diode or a transistor connected as a diode, each circuit including at least one of these semiconductor elements.

In many electronic circuit arrangements current divider circuits are required; i.e., circuits which supply a plurality of output currents the value of each of which is in a fixed accurate ratio to the value of an input current.

An example of a circuit arrangement in which such a current divider circuit is particularly useful is a digital-analog converter. Such a converter is used to provide an output voltage or output current of a value proportional to a digital input signal. This may simply be achieved by means of a cascade arrangement of current divider circuits.

In a known digital-analog converter (Electronics, Nov. 14, 1966, pages 142 – 148) the current dividers each consist, for example, of two closely matched transistors the emitters of which are connected to one another and the bases of which are at the same potential. Thus, the collector currents of the transistors will be equal to one another and approximately equal to one half of the total emitter current of the transistor pair. One of the collectors is connected to the common emitter of the transistors of the next transistor pair in the cascade circuit, where the same current division is effected. As a result, the currents at the free collector terminals of successive transistor pairs will be in the ration $1 : ½ : ¼ \ldots ½^n$, i.e., according to the binary code. By supplying these currents to a summing point in accordance with the digital signal the analog signal may be derived via an operational amplifier.

A second example of a circuit arrangement where such a current divider may be used is a current source; in particular a current source adjustable by means of a resistor. In such a current source circuit a current divider may be used which supplies two currents which are in a ratio of $1 : n$. The smaller one of these currents is made to flow through the series arrangement of the collector-emitter path of a first transistor and a resistor and the greater one through the collector-emitter path of a second transistor. The base-emitter path of this second transistor shunting the resistor and the base-emitter path of the first transistor. This ensures that the value of the sum current is determined by the value of the resistor and is substantially independent of the supply voltage with which the circuit is fed.

Finally such current dividers may advantageously be used in differential amplifiers to supply the quiescent currents for the various transistors of the differential amplifier and for adjusting succeeding stages of an amplifier to different quiescent currents.

The said three examples clearly show that current dividers have a very wide field of application. In all these applications an essential feature is the accuracy with which the desired current ratios are obtained. This requirement is particularly pronounced in the above mentioned digital-analog converters. In the afore-described design of the current dividers in such a D/A converter, deviations from the optimum are produced in the current ratios by the base currents of the transistors. Owing to the cascade arrangement of the transistor pairs these deviations of the various transistor pairs cummulate, so that the overall deviation may be appreciable. Attempts may be made to compensate for these deviations by the appropriate addition of an additional current to the sum current of each transistor pair. However, this requires a resistance network and terminals having accurately defined voltages, and this again cannot readily be achieved with a high degree of accuracy, while the presence of resistors is undesirable from the point of view of integration technology.

It is an object of the invention to provide current dividers which enable desired current ratios to be achieved with a high degree of accuracy and which may simply be integrated, because resistance networks and accurate reference voltages are dispensed with.

The invention is characterized in that the current divider includes a compensating circuit which supplies to and/or derives from each circuit an integral multiple of a current $I_b$, which is that basic current of each of the said transistors which corresponds to an emitter current I, such that the current deviations in these circuits, which are integral multiples of $I_b$, are completely compensated for; the compensating circuit including at least one compensating transistor having its emitter-collector path connected in a circuit having a current deviation of one sign and its base connected to a circuit having a current deviation of the other sign. The compensating transistor has the same relationship between the base current and the emitter current as have the said transistors.

In general it is desirable that a small impedance should be seen at one of the current terminals and a large impedance should be seen at the remaining current terminals. This enables a current to be simply supplied to the low-impedance terminal — the input terminal — such that the currents at the high-impedance terminals — the output terminals — and the current at the sum terminal are in an accurately defined ratio to the input current and may be supplied to further circuits. Further it is of advantage to ensure that the voltage drop between the input and output terminals and the sum terminal is a minimum, permitting the use of a low supply voltage. According to the invention the said requirements may be satisfied by ensuring that the compensating circuit is designed so that each connection possible connecting between the output terminals and the sum terminal includes the collector-emitter path or the collector-base path of at least one transistor and that there is established between the input terminal and the sum terminal a connection which includes only base-emitter paths of transistors.

It is further of advantage for the collectors of the parallel-connected transistors to be at substantially the same potential. This implies that the base-collector voltage of each transistor is substantially zero. This may be achieved by including diodes in the various circuits. Although a collector-base voltage of substantially zero volts is most desirable, it has been found that a voltage of about 1 volt is permissible without appreciably impairing the operation of the circuit.

Figure 7:
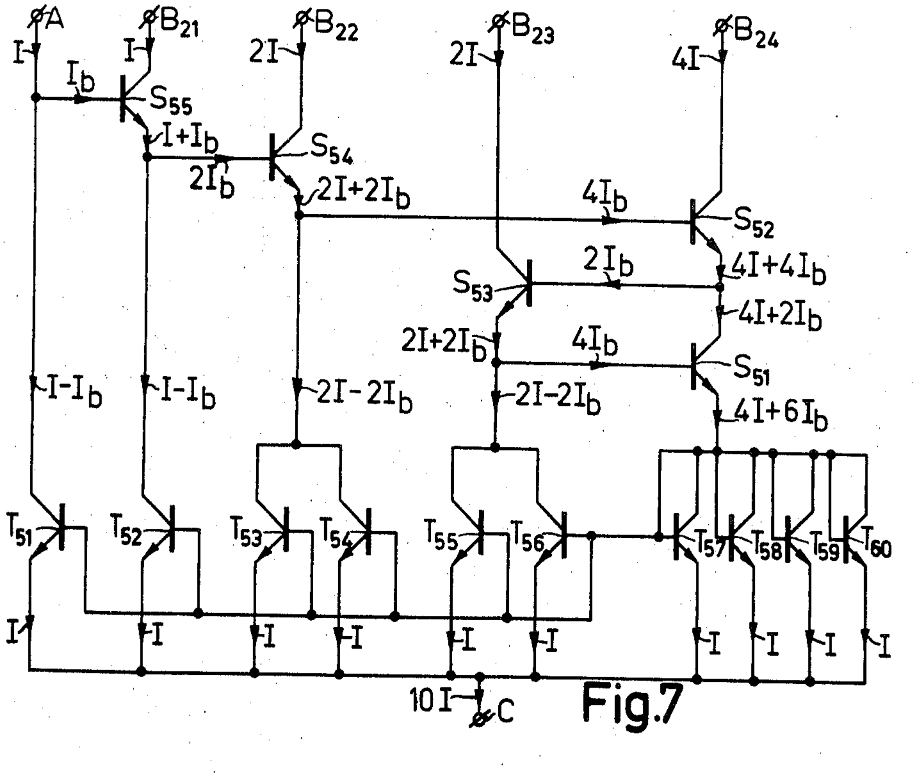
Figure 8:
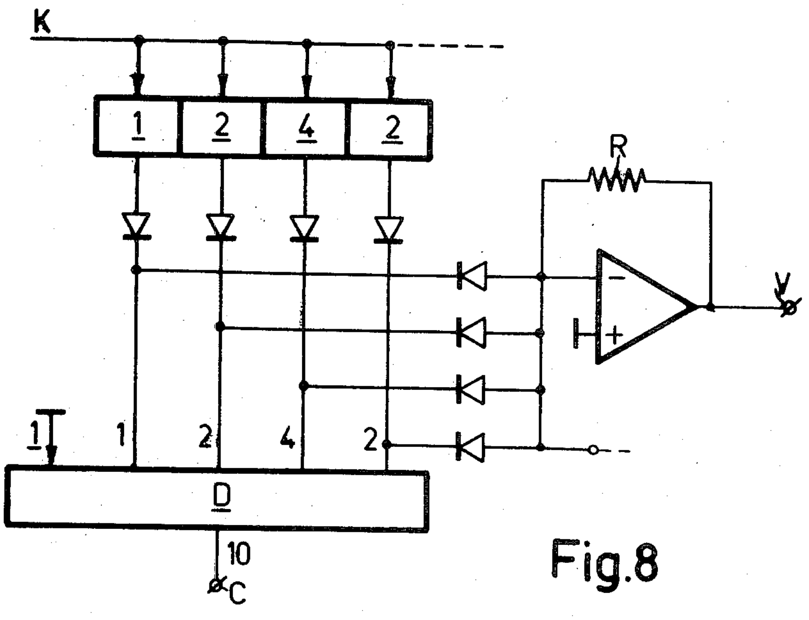
Figure 9:
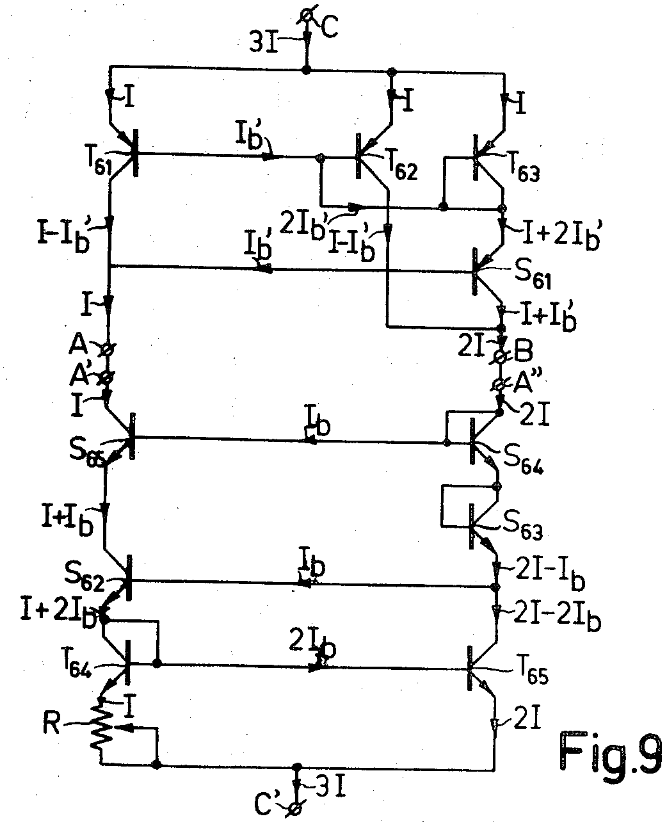

Embodiments of the invention will now be described, by way of example, with reference to the accompanying diagrammatic drawings:

FIGS. 1 to 7 are circuit diagrams of different embodiments of the current divider according to the invention, FIG. 8 shows a possible use of a current divider according to the invention in a digital-analog converter, and FIG. 9 shows its use in a current source which is adjustable by means of a resistor.

FIG. 1 shows a first embodiment of a current divider according to the invention. The circuit has two current terminals, A and B, and a sum terminal C. The current divider is designed so that the impedance seen by the terminal A is small, which enables a current to be simply supply this terminal, hereinafter referred to as input terminal. The currents at the terminal B (output terminal) and at the sum terminal C are in a fixed ratio to the said input current. Obviously, as an alternative a current may be supplied to the sum terminal C instead of to the input terminal A. Although the current divider shown is equipped with *npn* transistors, the divider may obviously be equipped with pnp transistors, and this naturally also applies to the dividers shown in the remaining Figures.

If an input current I is supplied to the current divider shown, current of values 4I and 5I are obtained at the terminals B and C respectively. For this purpose the sum terminal C is connected to the emitter of five closely matched *npn* transistors $T_1$, $T_2$, $T_3$, $T_4$ and $T_5$, four of which ($T_2$, $T_3$, $T_4$ and $T_5$) are connected in the output circuits of the current divider and one ($T_1$) in the input circuit. The base-emitter paths of all these transistors are connected in parallel, while the transistor $T_5$ is connected as a diode because its base is connected to its collector. Obviously the transistor connected as a diode may be replaced by a diode exhibiting the same behaviour as the transistors. Since all these transistors are as identical as possible and have the same base-emitter voltages, their emitter currents will be accurately equal, say equal to I. However, owing to the base currents of the transistors their collector currents will not be entirely equal. Assuming the base current of each transistor to be $I_b$, the collector currents of the transistors $T_1$, $T_2$, $T_3$ and $T_4$ will be equal to $I - I_b$, and the total current supplied to the transistor $T_5$ will be $I + 4I_b$, i.e., the sum of the collector currents $I - I_b$ of the transistor $T_5$ and the overall base current $5I_b$ of the five transistors. The collectors of the transistors $T_2$, $T_3$ and $T_4$ are interconnected, so that the junction point passes a current $3I - 3I_b$. It should be remarked that instead of the three parallel-connected transistors $T_2$, $T_3$ and $T_4$ a single transistor may be used, but this must then have an emitter area which is three times that of either of the transistors $T_1$ and $T_5$.

To obtain compensation for the deviations in the ratios of the currents in the input and output circuits there is connected in the output circuit a compensating transistor $S_1$ which is substantially identical to the other transistors. The emitter-collector path of this compensating transistor is connected in series with the transistor $T_5$ and connects the collector of this transistor to the output terminal B, while the base of the compensating transistor is connected to the input terminal A. Because the emitter current of this compensating transistor $S_1$ is equal to $I + 4I_b$, the base current will again be approximately $I_b$ and the collector current will be approximately $I + 3I_b$. Obviously, this is not exactly correct owing to the component $4I_b$ in the emitter current. However, the deviation in the base current $I_b$ is a second-order effect and will be neglected for simplicity. If now the collector of the transistor $T_1$ is connected to the input terminal A, the overall current passed by this terminal will be I. Connecting the common collector of the transistors $T_2$, $T_3$ and $T_4$ to the output terminal B simultaneously ensures that the overall output current is equal to 4I.

From the foregoing it will be clear that the arrangement described simply ensures that the ratio between the input and output currents has the desired value with a high degree of accuracy. Assuming the current gain factor of the transistors to be $\beta$, so that $I = \beta I_b$, then allowing for the deviation in the base current of the compensating transistor $S_1$ the value of the input current will be $I + 4(I/\beta^2)$ and the value of the output current will be $4I - 4(I/\beta^2)$, so that only a second-order deviation remains. For a current gain factor $\beta = 100$ this means that the deviations from the desired current will be only 0.04 percent.

As has been mentioned hereinbefore, the input impedance at the terminal A is small, because this terminal is connected to the sum terminal C via the base-emitter path of the compensating transistor $S_1$ and the parallel-connected base-emitter paths of the remaining transistors. However, the output impedance at the terminal B is high, because this terminal is connected to the sum terminal C via the collector-emitter paths of the transistors, i.e., via the collector-emitter path of the compensating transistor $S_1$ and via the parallel-connected collector-emitter paths of the transistors $T_2$, $T_3$ and $T_4$.

It will be clear that to obtain another ratio between the input current and the output current, in general a ratio of $1 : n$, instead of the three transistors $T_2$, $T_3$ and $T_4$ $(n - 1)$ transistors must be connected in parallel, while the further structure of the circuit may be identical to that shown. Thus, with a desired ratio of $1 : n$ between the input and output currents a single compensating transistor enables a high accuracy of these currents to be obtained.

Figure 2:
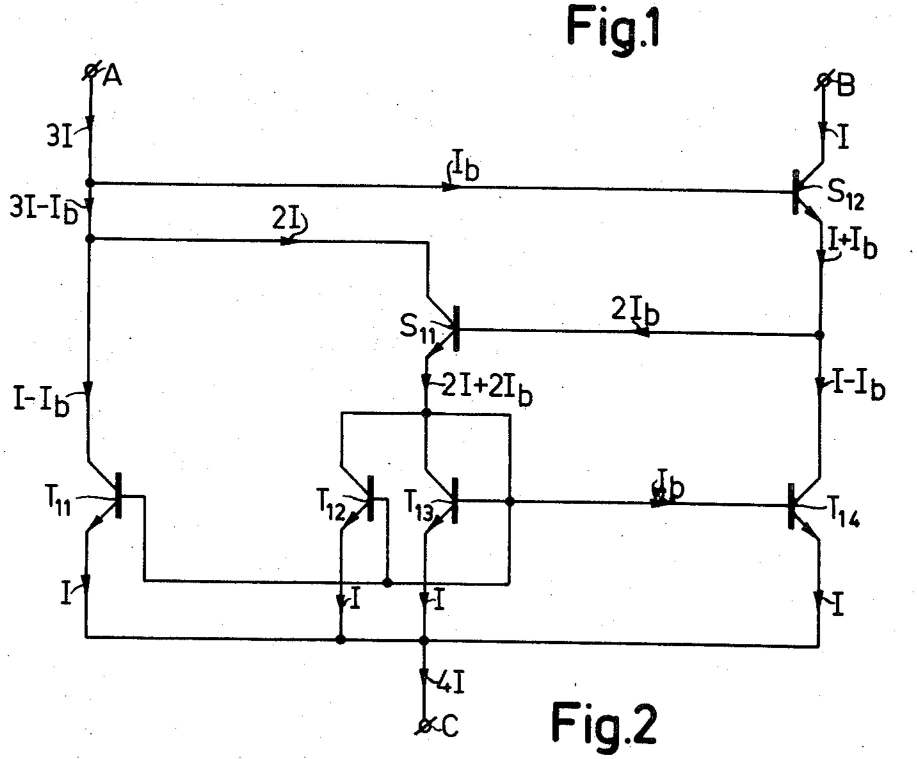

FIG. 2 shows a second embodiment of a current divider according to the invention which provides a ratio of 3 : 1 between the input current and the output current. For this purpose the circuit includes 4 transistors $T_{11}$, $T_{12}$, $T_{13}$ and $T_{14}$ the base-emitter paths of which are connected in parallel and three of which are connected in the input circuit and the remaining one in the output circuit. Two of the transistors included in the input circuits ($T_{12}$ and $T_{13}$) are connected as diodes. To compensate for the current deviations the common collector of these transistors is connected via the emitter-collector path of a first compensating transistor $S_{11}$ to the input terminal A, the base of this compensating transistor being connected to the output current. Since the collector of the transistor $T_{11}$ also is connected to the input terminal, the provision of the compensating transistor $S_{11}$ cause the current in the input circuit to be equal to $3I - I_b$ and that in the output circuit to be equal to $I + I_b$. This residual current deviation is fully compensated for by including a second compensating transistor $S_{12}$ in the output circuit and by connecting the base of this transistor to the input terminal. The Figure again clearly shows that in addition the input impedance is low and the output impedance is high.

As has been mentioned hereinbefore, it further is of advantage for the collector voltages of the transistors $T_{11}$, $T_{12}$, $T_{13}$ and $T_{14}$ to be equal. This corresponds to zero collector-base voltage for the transistors $T_{11}$ and $T_{14}$. This may be achieved by including one diode in the collector lead of the transistor $T_{14}$ and the series connection of two diodes in the collector lead of the transistor $T_{11}$.

If a current ratio of $n : 1$ is to be obtained, the input branch must include 2 diodes ($T_{12} + T_{13}$) and $(n - 2)$ transistors, the collectors of which are interconnected, while the further structure of the circuit arrangement may remain unchanged.

Figure 3:
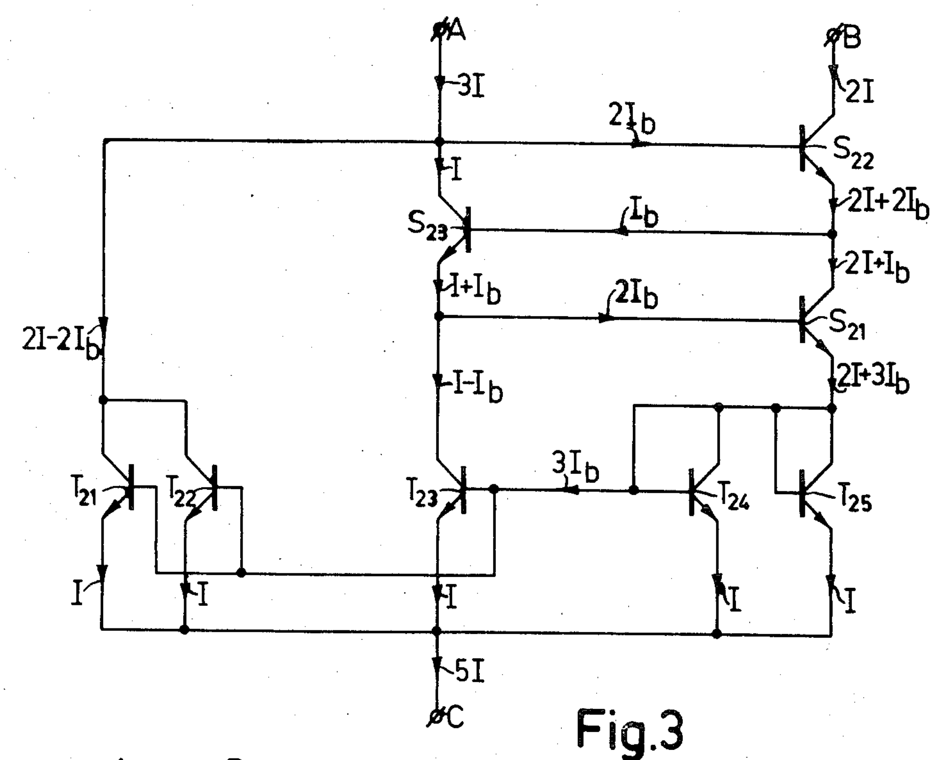

FIG. 3 shows an embodiment of a current divider according to the invention which enables a ratio of 3 : 2 to be accomplished between the input current and the output current. For this purpose the sum terminal C is again connected to the emitters of $3 + 2 = 5$ identical transistors ($T_{21}$ . . . . $T_{25}$) having base-emitter paths connected in parallel. The two transistors $T_{24}$ and $T_{25}$ in the output circuit are connected as diodes, while their collectors are interconnected. Two of the transistors in the input circuits ($T_{21}$ and $T_{22}$) are also connected in parallel. To compensate for current deviations, three compensating transistors $S_{21}$, $S_{22}$ and $S_{23}$ are provided. $S_{21}$ and $S_{22}$ being included in the output circuit and $S_{23}$ being included in the collector circuit of the transistor $T_{23}$. FIG. 3 clearly shows that by appropriately connecting these transistors, the current deviations may be fully compensated, while the input impedance is low and the output impedance is high.

If in general a current ratio of $(n + 1) : n$ is to be achieved in the output circuit, the two parallel connected diodes ($T_{24}$ and $T_{25}$) must be replaced by $n$ parallel-connected diodes, while in the input circuit two parallel-connected transistors ($T_{21}$ and $T_{22}$) are again directly connected to the input terminal, and the transistor $T_{22}$ must be replaced by $(n - 1)$ parallel-connected transistors.

Figure 4:
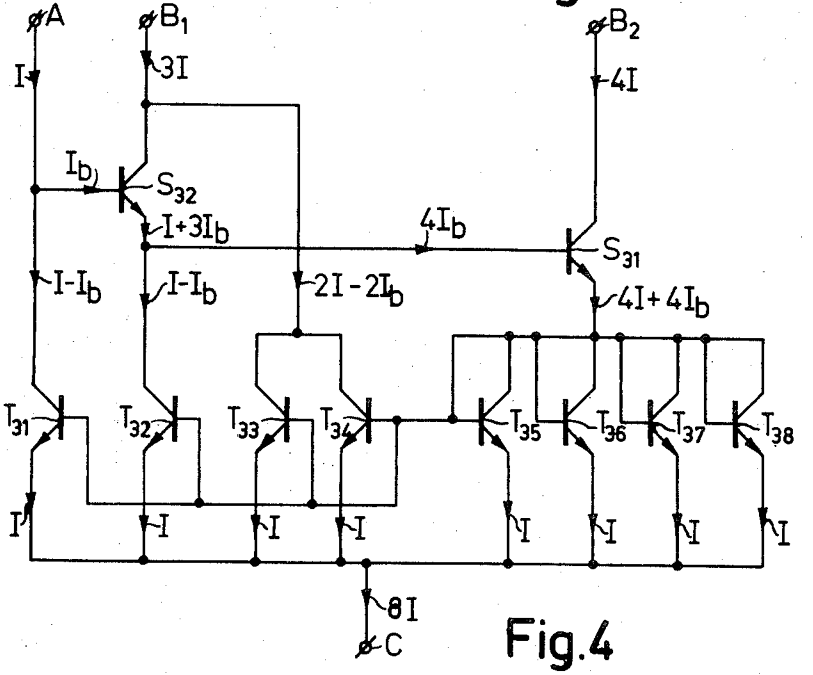

FIG. 4 shows an embodiment of a current divider according to the invention which instead of one output terminal has two output terminals $B_1$ and $B_2$ and which enables a ratio of 1 : 3 : 4 to be accomplished between the input current and the currents at the output terminals $B_1$ and $B_2$. For this purpose the sum terminal C is connected to the emitters of $1 + 3 + 4 = 8$ transistors ($T_{31}$ . . . . . $T_{38}$) having parallel-connected base-emitter paths; the transistor $T_{31}$ being included in the input circuit, three transistors ($T_{32}$, $T_{33}$, $T_{34}$) being included in the first output circuit and four transistors ($I_{35}$, $T_{36}$, $T_{37}$, $T_{38}$) being included in the second output circuit. All the latter four transistors are connected as diodes, and their collectors are interconnected. In the first output circuit two transistors ($T_{33}$ and $T_{34}$) are connected in parallel. It may readily be seen from FIG. 4 that compensation for the current deviations requires only two compensating transistors, $S_{31}$ and $S_{32}$; the current deviation in the second output circuit is fully compensated by the compensating transistor $S_{31}$ included in this circuit. The current deviation in the input circuit is compensated for by the base current of the second compensating transistor $S_{32}$ included in the collector circuit of the transistor $T_{32}$ in the first output circuit. The base of the first compensating transistor $S_{31}$ is connected to the collector of the transistor $T_{32}$, with the result that the deviation of the current in this collector circuit is equal but of opposite sign to the deviation of the current in the collector circuit of the transistors $T_{33}$ and $T_{34}$, so that when these currents are added the deviations are eliminated.

Instead of being connected to the collector of the transistor $T_{32}$ the base of the compensating transistor $S_{31}$ may be connected to the collectors of the transistors $T_{33}$ and $T_{34}$. However, this has the drawback that the output impedance at the terminal $B_1$ will be low.

To obtain different current ratios, for example $1 : n : (n + 1)$, the second output branch must include $(n + 1)$ parallel-connected diodes, and the first output branch must include, instead of the two parallel-connected transistors $T_{33}$ and $T_{34}$, $(n - 1)$ parallel-connected transistors, while the further structure of the circuit arrangement may remain unchanged.

Figure 5:
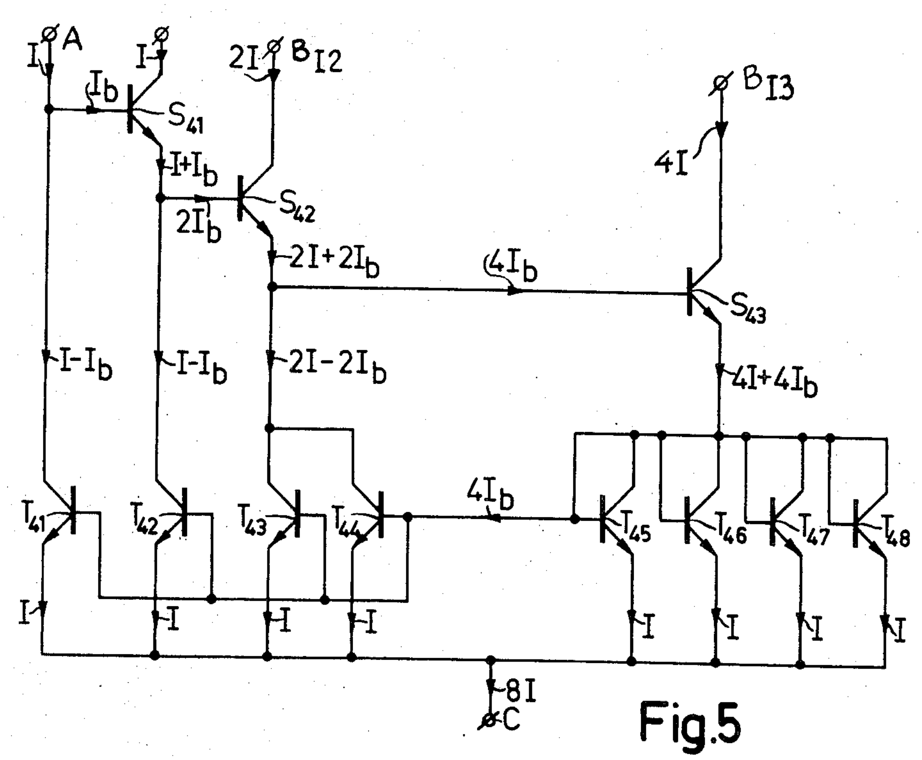

FIG. 5 shows a current divider which is particularly suitable for use in digital-analog converters and analog-digital converters. The current divider has three output terminals $B_{11}$, $B_{12}$, and $B_{13}$ from which may be derived output currents which are in a ratio of 1: 2 :4, i.e., according to the binary code, with respect to the input current at the terminal A. Each output circuit comprises the respective number of transistors ($T_{42}$, $T_{43}$, $T_{44}$ and $T_{45} - T_{48}$, respectively) having parallel-connected base-emitter paths. The four transistors $T_{45} - T_{48}$ in the third output circuit are connected as diodes, and these diodes are connected in parallel, as are the two transistors $T_{43}$ and $T_{44}$ in the second output circuit. To compenste for current deviations it is sufficient for the second and third output circuits each to include a compensating transistor $S_{42}$ and $S_{43}$ respectively), the base of which is connected to the preceding output circuit, while the first output circuit includes a compensating transistor $S_{41}$, the base of which is connected to the input circuit.

The number of output circuits may simply be extended. If another output terminal carrying a current 8I is required, eight transistors are to be connected in parallel in this output circuit. These eight transistors are connected as diodes instead of the transistors $T_{45} - T_{48}$. Compensation for the current deviation is again obtainable by including a compensating transistor in the respective output circuit, and the base of this compensating transistor must again be connected to the preceding output circuit; i.e., to the common collector of the transistors $T_{45} - T_{48}$.

The number of bits may also be extended by using the sum current at the terminal C as the input current for the input terminal of a second, identical current divider, for this sum current is 8I, so that the second current divider will supply output currents of 8I, 16I and 32I. Which of the two alternatives, extension of a single current divider or cascading of several current dividers, is to be chosen depends on the number of bits required. The first possibility, extension of the number of output stages in a single current divider, has the advantage that the supply voltage may be low. The second possibility — cascading several current dividers according to the invention — has the advantage that for the same number of bits the required number of transistors is much smaller.

A third alternative consists in that the collector of the transistor in the output circuit, which is one of the transistors having its base-emitter paths connected in parallel, is directly connected to the sum terminal of a preceding current divider, the compensation for the current deviation being effected not for each separate current divider but for the cascade connection of several current dividers. The use of a suitable compensating circuit ensures that the number of transistors required is comparable to the number required in the second alternative and also that the supply voltage required may be smaller.

Figure 6:
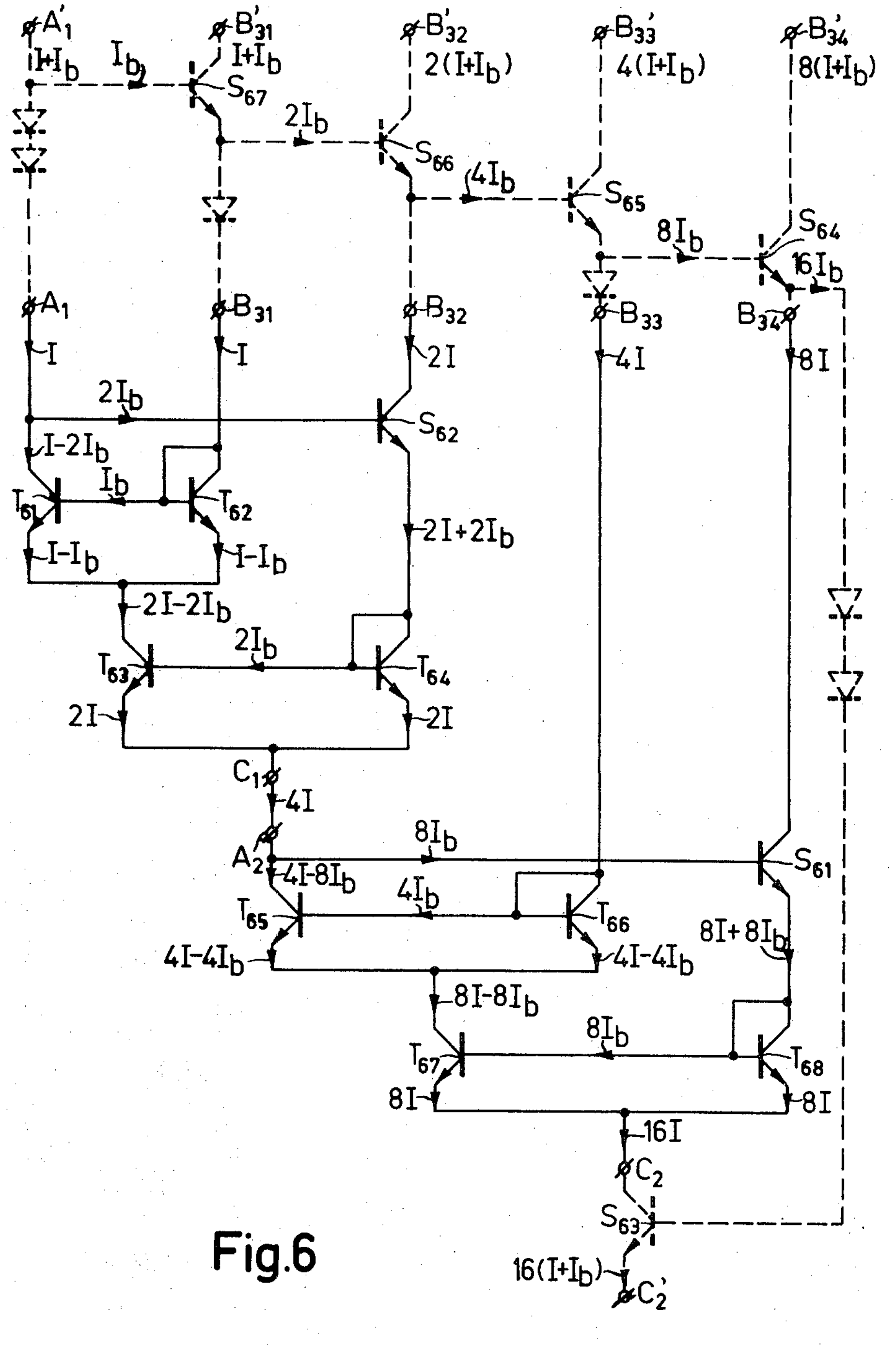

FIG. 6 shows a current divider designed partly according to the second alternative and partly according to the third alternative. The current divider comprises the cascade connection of two smaller current dividers which have current terminals $A_1$, $B_{31}$, $B_{32}$, $C_1$ and $A_2$, $B_{33}$, $B_{34}$, $C_2$ respectively. A consideration of the design of each current divider, for example the divider having the terminals $A_1$, $B_{31}$, $B_{32}$, $C_1$, shows that it comprises the cascade connection of a first pair of transistors ($T_{61}$, $T_{62}$) and a second pair of transistors ($T_{63}$, $T_{64}$), the base-emitter paths of the transistors of each pair being connected in parallel. Further, one of the transistors ($T_{62}$ and $T_{64}$ respectively) of each pair of transistors is connected as a diode, and the collector of the transistor $T_{63}$ of the second pair is connected to the emitters of the transistors of the first pair. This arrangement results in that the collector currents of the transistors $T_{61}$, $T_{62}$ and $T_{64}$ are in the ratio of 1 : 1 : 2, but the current deviations have not yet been compensated for. It has been found that these deviations may be compensated for by connecting the emitter-collector path of a single compensating transistor $S_{62}$ in series with the transistor $T_{64}$ and by connecting its base to the input terminal $A_1$. By connecting the sum terminal $C_1$ of this current divider to the input terminal $A_2$ of a succeeding identical current divider the number of output terminals is extended by two, each terminal passing a current twice that of the current passed by the precediNg terminal, as is indicated in the FIGURE. Hence, a current divider of this design is particularly suitable for extending the number of output terminals and output currents having relative ratios according to the binary code, i.e., for digital-analog or analog-digital converters, while the required number of transistors and the required supply voltage are maintained within given limits.

A disadvantage of a current divider of this design is that no longer voltage variations are allowed at the terminals $B_{31}$ and $B_{33}$, for these terminals $B_{31}$ and $B_{33}$ are directly connected to the bases of the transistors $T_{61}$ and $T_{65}$ respectively, while for satisfactory operation of the divider the base-collector voltages of the transistors should be as small as possible.

To avoid this disadvantage the circuit arrangement may be extended in the manner shown in broken lines. In each of the output circuits there is included the emitter-collector path of an additional compensating transistor ($S_{64}$ – $S_{67}$) the base of which is currents to the preceding output circuit or to the input circuit respectively. Further the sum terminal $C_2$ is connected to the collector of an additional compensating transistors $S_{63}$ the base of which is connected to the last output circuit. As may clearly be seen from the Figure, the currents at output terminals $B'_{31}$ – $B'_{34}$ again are in the appropriate ratio to the current at an input terminal $A'_1$ and a sum terminal $C'_2$, while at each of the output terminals voltage variations are permissible. As has been mentioned hereinbefore, it is desirable for the collector-base voltages to be approximately equal for all the transistors. This may be achieved by the inclusion of diodes in the manner shown in FIG. 6, which ensures that the base-collector voltages of all the transistors are substantially zero.

FIG. 7 shows a current divider particularly suitable for a 1 – 2 – 4 – 2 decade counter. A current divider has four output circuits having output terminals $B_{21}$, $B_{22}$, $B_{23}$ and $B_{24}$ which carry currents I, 2I, 2I and 4I respectively. The divider comprises 1 + 1 + 2 + 2 + 4 = 10 transistors ($T_{51}$ – $T_{60}$) with parallel connected base-emitter paths, the four transistors ($T_{57}$ – $T_{60}$) in the fourth output circuit being connected as diodes. Furthermore, the two transistors ($T_{53}$, $T_{54}$ and $T_{55}$, $T_{56}$ respectively) in the second and third output circuits are connected in parallel.

Compensation for the current deviations is obtained by means of two compensating transistors ($S_{51}$ and $S_{52}$) which are included in the fourth output circuit and the bases of which are connected to the third and the second output circuits respectively. The third output circuit includes a compensating transistor $S_{53}$ the base of which is connected to the fourth output circuit, and the first and second output circuits include compensating transistors $S_{55}$ and $S_{54}$ respectively the bases of which are connected to the input circuit and to the first output circuit respectively.

FIG. 8 shows how a current divider as shown in FIG. 7 may be used in a digital-analog or analog-digital converter. The current divider shown in FIG. 7 is indicated schematically by a block D and supplies four output currents representing the values 1, 2, 2 and 4 respectively. The four output circuits of this current divider are connected through diodes to a unit which is indicated schematically by a block 1 – 2 – 4 – 2. It should be noted that obviously the diodes may be replaced by field-effect transistors or other circuit elements suitable for this purpose. Further, the four output terminals of the current divider are connected through diodes to an input of an operational amplifier. When the arrangement is used as a digital-analog converter it depends on the digital signal whether the various currents flow through the unit or through the input terminal of the operational amplifier. The currents flowing through the operational amplifier are immediately compensated for by feedback through a resistor R, and consequently the output voltage V is represnetative of the sum of the currents and hence of the value of the digital signal.

When the arrangement is used as an analog-digital converter a digital signal increasing by increments of 1 is applied to the unit via a clockline K. The corresponding analog signal at the output of the amplifier is compared with the analog signal present. As soon as correspondence is attained, the contents of the unit, i.e., the digital signal, is representative of the analog signal.

The sum terminal C of the current divider may be connected to the input terminal of a succeeding current divider. Via the latter current divider the tens of the digital signal may be converted to analog form.

The use of current dividers of high impedance at the output terminals provides the advantage that voltage variations at these terminals are permissible. This advantage is greatest when field-effect transistors are used. The latter have the advantage that they require substantially no current from the control unit, but also the disadvantage that they produce voltage variations at the output terminals of the current dividers, but as set out hereinbefore this need not adversely affect the operation of the converter.

Obviously, in such converters current dividers as shown in FIG. 5 or FIG. 6 or extensions thereof may also be used. Furthermore, use may naturally be made also of the cascade connection of a plurality of current dividers which are designed so, and produce current ratios such, that the overall current ratio at the output terminals is arranged according to the binary code.

A possible interesting modification consists in the cascade connection of a first current divider using transistors of one conductivity type and of a second current divider using transistors of the other conductivity type. In this arrangement the sum terminals of the two current dividers are connected to one another, and the input terminal of the first current divider may be connected to the sum terminal of a preceding current divider and the input terminal of the second current divider may be connected to the input terminal of a succeeding current divider. The output terminals of one of the two current dividers may again be used in the digital-analog or analog-digital conversion, and those of the other may be used for other purposes.

FIG. 9 shows a current regulator which is adjustable by means of a resistor and in which current dividers according to the invention are used. The current regulator includes a first current divider which at terminals A and B carries an input current and an output current respectively in a ratio of 1 : 2. This current divider comprises pnp transistors $T_{61}$, $T_{62}$ and $T_{63}$ and a compensating transistor $S_{61}$, the arrangement being according to the principle described with reference to FIG. 1.

The input and output currents at the terminals A and B of the said current divider are supplied to terminals A' and A'' of a second circuit arrangement which comprises a first and a second branch which connect the input terminals A' and A'' respectively to a sum terminal C'. This sum terminal C' is connected through a resistor R to the emitter of a transistor $T_{64}$ and also to the emitter of the transistor $T_{65}$. The transistor $T_{64}$ is connected as a diode and its base is connected to the base of the transistor $T_{65}$. It is required that the current flowing through the resistor R is accurately equal to one half of the emitter current of the transistor $T_{65}$. For this purpose the first branch includes two compensating transistors $S_{62}$ and $S_{65}$ the bases of which are connected to the second branch. To prevent these transistors from being short-circuited diodes $S_{63}$ and $S_{64}$ are connected in the second branch between the bases of the transistors $S_{62}$ and $S_{65}$. This ensures that the two currents I and 2I at the terminals A and B of the current divider are accurately operative in the emitter circuits of the transistors $T_{64}$ and $T_{65}$ respectively also.

As a result, the value of the current I and hence the values of the currents 3I at the sum terminals C and C' are accurately adjustable by means of the resistor R, for the voltage between the base of the transistor $T_{65}$ and the sum terminal C' is $V = kT/Q \ln 2I/I_0$, ($k$ = Boltzmann constant, T = temperature in °K) and this must be equal to the voltage between the base of the transistor $T_{64}$ and the sum terminal C', which is equal to $kT/q \ln (I/I_0) + IR$. From this it follows that $I = kT/qR \ln 2$, so that the value of the current I is determined by the resistor R and is substantially independent of the supply voltage.

Thus an accurate current source adjustable by a resistor is obtained.

It will be clear that it is also possible to use one of the other current dividers, such as a current divider having more than one output terminal. In this case the input terminal and one of the output terminals are connected to the terminals of the second circuit, while from the other output terminals output currents can be derived.

This circuit may also be used as a thermometer by using the positive temperature coefficient of the current. By connecting a resistor in series with the sum terminal C or the sum terminal C' a voltage dependent upon the temperature is obtainable.

Instead of using a current ratio 1 : 2 in the branches of the circuit, other current ratios may also be employed, in which case the compensation for the base currents must obviously be adapted also.

Thus, in this current source circuit no current is supplied to the circuit, as is the case in the aforementioned circuits, but a voltage is set up between the terminals C and C', while the current supplied by the circuit is determined by the resistor R.

The transistor or diode $T_{64}$ may simply be replaced by the parallel connection of several transistors or diodes, resulting in a different relationship between the value of the current I and the resistor R. Naturally, as an alternative the emitter surface of the transistor $T_{64}$ may be increased.

What is claimed is:

1. A current divider comprising current terminals carrying currents having predetermined integral ratios relative to one another, said ratios differing from unity between at least two currents of said current terminals, a common terminal carrying the sum of the currents at said current terminals, a plurality of circuits for connecting each of said current terminals to said common sum terminal, said circuits comprising at least one semiconductor element in each circuit for producing the currents at said terminals, said semiconductor elements comprising transistors of the same type having equal base-emitter voltages thereby passing emitter currents of said ratios, the highest common factor being unity current, at least one of said semiconductor elements operating as a diode, and compensating circuits for correcting deviations in said ratios caused by the base currents of the transistors of said circuits corresponding to said emitter current, said compensating circuits comprising at least one transistor having its emitter-collector path in a circuit having a current deviation of one polarity and its base connected to a circuit having a current deviation of opposite polarity, said compensating transistor having the same ratios between the base and emitter currents as the transistors of said circuits.

2. Current divider as claimed in claim 1, wherein one of the current terminals comprises an input terminal for receiving an input current, the circuit connecting the input terminal to the common sum terminal being the input circuit, and the remaining current terminals comprise output terminals, the circuits connecting the output terminals to the common sum terminals being output circuits, said compensating circuits operating so that a connection between the input terminal nd the sum terminal comprises only base-emitter paths of the transistors of said circuits and any connections between the output terminals and the sum terminal comprises the collector of at least one transistor.

3. Current divider as claimed in claim 2, wherein the compensating circuit comprises a plurality of diodes so that at least the base-emitter paths of the transistors, shunted by a base-emitter path of another transistor, have minimum collector-base voltages.

4. Current divider as claimed in claim 2, wherein one output terminal carries a current that is $n$ times the current supplied to said input terminal, the sum terminal being connected to the emitters of $(n + 1)$ matched transistors having parallel-connected base-emitter paths, one of said $(n + 1)$ matched transistors being connected in said input circuit and the remaining transistors being connected in said output circuits, one of the $n$ transistors in said output circuit operating as a diode and being connected to the output terminal through the emitter-collector path of a first compensating transistor, the collectors of the remaining transistors in the output circuits being connected to the output terminal, and the base of said compensating transistor being connected to the collector of the input circuit transistor and the input terminal.

5. Current divider as claimed in claim 2, comprising an output terminal carrying a current that is 1/n times the current at said input terminal, said sum terminal being connected to the emitters of (n+1) matched transistors having parallel-connected base-emitter paths, one of said (n+1) transistors being connected in said output circuit and the remaining transistors being connected in said input circuit, two of the transistors connected in the input circuit operating as diodes and being connected through the emitter-collector path of a second compensating transistor to the input terminal, the collectors of the remaining transistors in the input circuit being connected to the input terminal, the base of said second compensating transistor being connected between the collector of the transistor in the output circuit and the emitter of a first compensating transistor having its base connected to the input terminal and its collector connected to the output terminal.

6. Current divider as claimed in claim 2, comprising an output terminal carrying a current that is $n/(n + 1)$ times the input current at said input terminal, said sum terminal being connected to the emitters of $(n + n + 1)$ matched transistors having parallel-connected base-emitter paths, $(n + 1)$ of these transistors being connected in the input circuit and the remaining $n$ transistors being connected in the output circuits, the collectors of the n transistors in the input circuit being connected to the input terminal, the transistors in the output circuit operating as diodes and having their common collector connected through the series connection of the emitter-collector paths of first and third compensating transistors to the output terminal, the base of the first compensating transistor being connected to the collectors of the remaining input circuit transistors and through the emitter collector path of a second compensating transistor to the input terminal, the base of the second cmpensating transistor being connected between the emitter of the third compensating transistor and the collector of the first compensating transistor and the base of the third compensating transistor being connected to the input terminal

7. Current divider as claimed in claim 2, wherein said plurality of circuits comprises a first and a second output circuit, and said current terminals comprise a first and a second output terminal, the currents at the input terminal and at the first and at the second output terminal being in a ratio of $1 : n\ i\ (n + 1)$, the sum terminal being connected to the emitters of $(1 + n + n + 1)$ matched transistors having parallel-connected base-emitter paths, one of said $(1 + n + n + 1)$ transistors being in the input circuit, $n$ of said $(1 + n + n + 1)$ transistors being in the first output circuit and the remaining $(n + 1)$ transistors being in the second output circuit, the $(n + 1)$ transistors in the second output circuit being connected as diodes and having their common collector connected through the emitter-collector path of a first compensating transistor to the second output terminal, the collectors of $(n - 1)$ transistors in the first output circuit being connected to the first output terminal, and the collector of the remaining transistors in the first output circuit being connected to the base of the first compensating transistor and, through the emitter-collector path of a second compensating transistor to the first output terminal, the base of the said second compensating transistor being connected to the collector of the transistor in the input circuit and the input terminal.

8. Current divider as claimed in claim 2, wherein said plurality of circuits comprise $p$ output circuits and said current terminals comprise $p$ output terminals, the currents at the input terminals and at the output terminals being in the ratio of $1 : 1 : 2 : 4 \ldots 2^{p-1}$, the sum terminal being connected to the emitters of $(1 + 1 + 2 + 4 \ldots . + 2^{p-1})$ matched transistors having parallel-connected base-emitter paths, each circuit comprising a plurality of said transistors corresponding to said ratios, the $2^{p-1}$ transistors in the $p^{th}$ output circuit operating as diodes and each output circuit comprising the emitter-collector paths of compensating transistors connecting the interconnected collectors of the transistors in respective output circuits to respective output terminals, the base of each compensation transistor being connected to the collectors of the transistors in the preceding circuits.

9. Current divider as claimed in claim 2, wherein said plurality of circuits comprises 4 output circuits and said current terminals comprise 4 output terminals, the currents at the input terminal and at the 4 output terminals being in the ratio of $1 : 1 : 2 : 2 : 4$, the sum terminal being connected to the emitter of $(1 + 1 + 2 + 2 + 4)$ matched transistors having parallel-connected base-emitter paths, each circuit comprising a plurality of these transistors which corresponds to said ratio, the four transistors in the fourth output circuit operating as diodes and having their interconnected collectors connected through the series connection of the emitter-collector path of a first and a third compensating transistor to the fourth output terminal, the base of the first compensating transistor being connected to the interconnected collectors of the transistors included in the third output circuit and through the emitter-collector path of a second compensating transistor to the third output terminal, the base of the third compensating transistor being connected to the interconnected collectors of the transistors in the second output circuit and through the emitter-collector path of a fourth compensating transistor to the second output terminal, the base of this fourth compensating transistor being connected to the collector of the transistor included in the first output circuit and through the emitter-collector path of a fifth compensating transistor to the first output terminal, the base of this fifth compensating transistor being connected to the input terminal and to the collector of the transistor included in the input circuit, and the base of the second compensating transistor being connected between the collector of the first compensating transistor and the emitter of the third compensating transistor.

10. Current divider as claimed in claim 2, wherein said plurality of circuits comprises two output circuits and said current terminals comprise a first and a second output terminal, the input currents at the input terminal being in the ratio of 1 : 1 : 2, the sum terminal being connected to the emitters of a first and a second matched transistor, the base-emitter paths of said transistors being connected in parallel, the first transistor operating a diode and being connected through the emitter-collector path of a first compensating transistor to the second output terminal, the collector of the second transistor being connected to the emitters of a third and a fourth matched transistor having parallel-connected base-emitter paths, said third transistor operating as a diode and being connected to the first output terminal, and the fourth transistor being connected to the input terminal and to the base of the compensating transistor.

11. Current divider comprising the cascade arrangement of a plurality of current dividers as claimed in claim 10, wherein each output circuit comprises the emitter-collector path of an additional compensating transistor having its emitter connected to the base of the additional compensating transistor in the succeeding output circuit, the base of the additional compensating transistor in the first output circuit being connected to the input terminal, and the emitter of the additional compensating transistor in the last output circuit being connected to the base of an additional compensating transistor having its collector connected and the sum terminal thereby deriving the sum current from the emitter of said additional compensating transistor. each

12. A digital to analogue converter comprising means for producing digital signals, a current divider for receiving output currents representing the digital signals, said current divider comprising current terminals carrying currents having integral ratios of $1 : 1 : 2 : 4 \ldots 2^{p-1}$, a common terminal carrying the sum of the currents at said current terminals, one of said current terminals comprising an input terminal for receiving input currents, the circuit connecting the input terminal to the common sum terminal being the input circuit, and the remaining current terminals comprising output terminals, the circuits connecting the output terminals to the common sum terminals being output circuits, a plurality of circuits for connecting each of p output terminals to said common sum terminal, said circuits comprising at least one transistor in each circuit for producing the currents at said terminals, said transistors being of the same type and having equal base-emitter voltages thereby passing emitter currents having said ratios, the common sum terminal being connected to the emitters of $(1 + 1 + 2 + 4 \ldots +2^{p-1})$ matched transistors having parallel-connected base-emitter paths, each circuit comprising a plurality of said transistors corresponding to said ratios, the $2^{p-1}$ transistors in the $p^{th}$ output circut operating as diodes, and compensating transistors for correcting deviations in said ratios caused by the base currents of the transistors of said circuit corresponding to said emitter current, said compensating transistor comprising at least one transistor having its emitter-collector path in a circuit having a current deviation of one polarity and the base of said compensating transistor in a circuit having a current deviation of opposite polarity said compensating transistors having the same ratios between the base and emitter currents as the transistors of said circuits and operating so that connections between the input terminal and the sum terminal comprises only base-emitter paths of the transistors of said circuits and any connections between the output terminals and the sum terminal comprises the collector of at least one transistor, and means for operating with said current divider to produce an output voltage corresponding to the sum of said currents corresponding to the digital signal.

13. An adjustable current source comprising a current divider, said divider comprising current terminals carrying currents having predetermined integral ratios relative to one another, a common terminal carrying the sum of the currents at said current terminal, one of said current terminals comprising an input terminal, the circuit connecting the input terminal to the common sum terminal being the input circuit, and the remaining current terminals comprising output terminals, the circuits connecting the output terminals to the common sum terminals being output circuits, a plurality of circuits for connecting each of said current terminals to said common sum terminal, said circuits comprising at least one semiconductor element in each circuit for producing the currents at said terminals, said semiconductor elements comprising transistors of the same type having equal base-emitter voltages thereby passing emitter currents of said ratios, the highest common factor being unity current, at least one of said semiconductor elements operating as a diode, and compensating circuits for correcting deviations in said ratios caused by the base currents of the transistors of said circuits corresponding to said emitter current, said compensating circuits comprising at least one transistor having its emitter-collector path in a circuit having a current deviation of one polarity and its base connected to a circuit having a current deviation of opposite polarity, said compensating transistor having the same ratios between the base and emitter currents as the transistors of said circuits, a circuit arrangement comprising first and second circuits terminating in a common sum terminal, said input and output terminals of said current divider being connected to said second and first circuits respectively, said first circuit comprising transistors of a type opposite to the transistors of said current divider and having its emitter connected to said common sum terminal, and means for compensating for current deviations cause by the base current of said transistor, said second circuit comprising a transistor of the same type as the transistor of said first circuit and operating as a diode, and a variable resistor in series and shunting the base-emitter path of the transistor of said first circuit.

14. Current divider as claimed in claim 10, wherein each output circuit comprises the emitter-collector path of an additional compensating transistor having its emitter connected to the base of said additional compensating transistor in the succeeding output circuit, the base of the additional compensating transistor in the first output circuit being connected to the input terminal, and the emitter of the additional compensating transistor in the last output circuit being connected to the base of an additional compensating transistor having its collector connected to the sum terminal thereby deriving the sum current from the emitter of said additional compensating transistor.

15. A digital to analogue converter as claimed in claim 12, wherein sid plurality of circuits comprises two output circuits and said current terminals comprise a first and a second output terminal, the input current at the input terminal and the output currents at the first and second output terminals being in the ratio of 1 : 1 : 2, the sum terminal being connected to the emitters of a first and a second matched transistor, the base-emitter paths of said transistors being connected in parallel, the first transistor operating s a diode and being connected through the emitter-collector path of a first compensating transistor to the second output terminal, the collector of the second transistor being connected to the emitters of a third and fourth matched transistor having parallel-connected base-emitter paths, said first output terminal, the fourth transistor being connected to the input terminal and to the base of the compensating transistor.

15. A digital to analogue converter as claimed in claim 12, wherein said plurality of circuits comprises two output circuits and said current terminals comprise a first and a second output terminal, the input current at the input terminal and the output currents at the first and second output terminals being in the ratio of 1 : 1 : 2, the sum terminal being connected to the emitters of a first and a second matched transistor, the base emitter paths of said transistors being connected in parallel, the first transistor operating as a diode and being connected through the emitter-collector path of a first compensating transistor to the second output terminal, the collector of the second transistor being connected to the emitters of a third and a fourth matched transistor having parallel-connected base-emitter paths, said third transistor operating as a diode and being connected to the first output terminal, the fourth transistor being connected to the input terminal and to the base of the compensating transistor.

16. A digital to analogue converter comprising the cascade arrangement of a plurality of current dividers as claimed in claim 15, wherein each output circuit comprises the emitter-collector path of an additional compensating transistor having its emitter connected to the base of the additional compensating transistor in the succeeding output circuit, the base of the additional compensating transistor in the first output circuit being connected to the input terminal, and the emitter of the additional compensating transistor in the last output circuit being connected to the base of an additional compensating transistor having its collector connected to the sum terminal thereby deriving the sum current from the emitter of said additional compensating transistor.

* * * * *

PO-1050
(5/69)

UNITED STATES PATENT OFFICE
CERTIFICATE OF CORRECTION

Patent No. 3,766,543 Dated October 16, 1973

Inventor(s) JAN TE WINKEL ET AL

It is certified that error appears in the above-identified patent and that said Letters Patent are hereby corrected as shown below:

In the Abstract, line 3, change "termiansl" to --terminals--;

line 5, change "mathced" to --matched--.

Column 2, line 55, cancel "connection";

line 56, change "connecting" to --connection--.

Column 7, line 37, change "precediNg" to --preceding--;

line 56, change "currents" to --connected--.

Claim 7, line 67, change "1:ni" to --1:n:--.

Signed and sealed this 16th day of April 1974.

(SEAL)
Attest:

EDWARD M.FLETCHER,JR.
Attesting Officer

C. MARSHALL DANN
Commissioner of Patents

,<9